(12) United States Patent
Takahashi

(10) Patent No.: US 12,389,823 B2
(45) Date of Patent: Aug. 19, 2025

(54) WORKING MACHINE INCLUDING A LOCK MEMBER THAT RESTRICTS OPERATION OF A TRIGGER MEMBER

(71) Applicant: MAKITA CORPORATION, Anjo (JP)

(72) Inventor: Noriaki Takahashi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 758 days.

(21) Appl. No.: 17/727,917

(22) Filed: Apr. 25, 2022

(65) Prior Publication Data

US 2022/0346312 A1  Nov. 3, 2022

(30) Foreign Application Priority Data

Apr. 30, 2021 (JP) ................................. 2021-077545

(51) Int. Cl.
*A01D 34/82* (2006.01)
*A01D 34/68* (2006.01)
*A01D 101/00* (2006.01)

(52) U.S. Cl.
CPC .......... *A01D 34/824* (2013.01); *A01D 34/68* (2013.01); *A01D 2034/6843* (2013.01); *A01D 2101/00* (2013.01)

(58) Field of Classification Search
CPC .................. A01D 34/00–34/905; B62D 51/04
See application file for complete search history.

(56) References Cited

U.S. PATENT DOCUMENTS

| | | | | |
|---|---|---|---|---|
| 3,694,855 A | * | 10/1972 | Meyer | A01D 34/49 280/655.1 |
| 5,095,769 A | * | 3/1992 | Bowden | G05G 5/005 74/480 R |
| 5,203,147 A | * | 4/1993 | Long | H01H 9/06 56/10.1 |
| 5,355,661 A | * | 10/1994 | Tomiyama | B62D 11/183 56/11.1 |
| 6,078,015 A | * | 6/2000 | Martinez | A01D 34/6818 200/332.2 |

(Continued)

FOREIGN PATENT DOCUMENTS

| | | |
|---|---|---|
| JP | 61-204433 U | 12/1986 |
| JP | 2013-27 A | 1/2013 |

OTHER PUBLICATIONS

Japanese Office Action mailed on Jul. 30, 2024 in Application No. 2021-077545.

*Primary Examiner* — Joseph M Rocca
*Assistant Examiner* — Madeline I Runco
(74) *Attorney, Agent, or Firm* — Sughrue Mion, PLLC

(57) ABSTRACT

A working machine may include a body, a working part, a prime mover, a handle, a trigger member configured to be operated by the user for driving the prime mover; and a lock member. The handle may be configured to shift between a working state and a non-working state. The lock member may be configured to: move between a non-restriction position and a restriction position, be positioned at the non-restriction position when the handle is in the working state, be positioned at the restriction position when the handle is in the non-working state, and move from the non-restriction position to the restriction position in response to shift of the handle from the working state to the non-working state.

7 Claims, 14 Drawing Sheets

(56) References Cited

U.S. PATENT DOCUMENTS

| | | | |
|---|---|---|---|
| 7,523,600 B2* | 4/2009 | Sasaoka | A01D 34/824 |
| | | | 56/10.5 |
| 10,485,176 B2* | 11/2019 | Yamaoka | A01D 34/824 |
| 2012/0317949 A1 | 12/2012 | Abe et al. | |
| 2015/0101301 A1* | 4/2015 | Yamaoka | A01D 34/828 |
| | | | 56/10.8 |
| 2017/0086375 A1* | 3/2017 | Yamaoka | A01D 34/006 |
| 2019/0269073 A1 | 9/2019 | Yamaoka et al. | |
| 2020/0000030 A1* | 1/2020 | Wei | A01D 75/18 |
| 2021/0276417 A1* | 9/2021 | Krolo | B60K 1/04 |
| 2023/0172101 A1* | 6/2023 | Lardieri | A01D 34/006 |
| | | | 56/10.8 |

* cited by examiner

FIG. 5
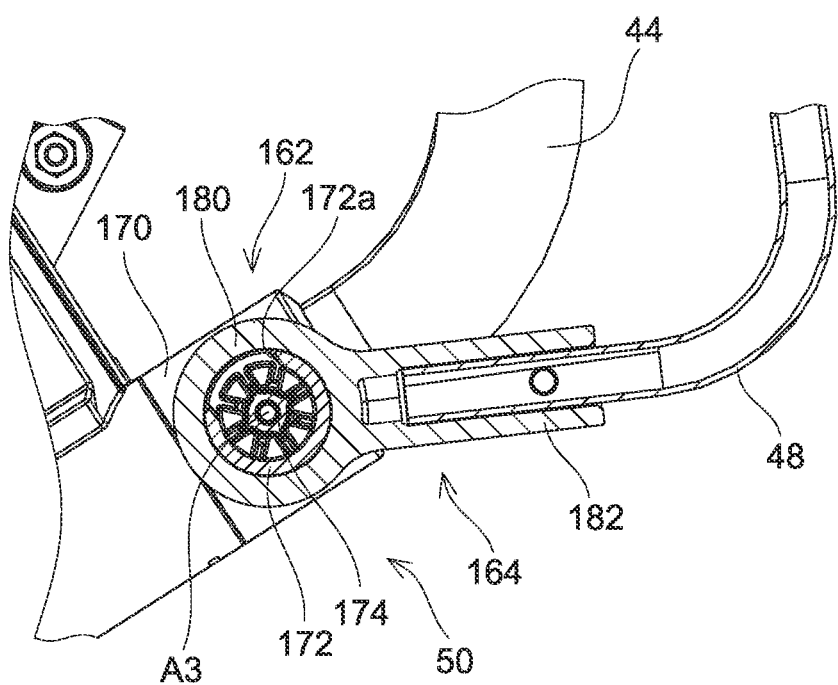
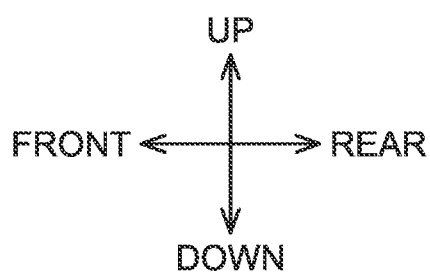

WORKING MACHINE INCLUDING A LOCK MEMBER THAT RESTRICTS OPERATION OF A TRIGGER MEMBER

CROSS-REFERENCE TO RELATED APPLICATION

This application claims priority to Japanese Patent Application No. 2021-077545 filed on Apr. 30, 2021, the contents of which are hereby incorporated by reference into the present application.

TECHNICAL FIELD

The technology disclosed herein relates to a working machine.

BACKGROUND ART

US Patent Application Publication No. 2019/269073 describes a working machine that includes a body, a working part disposed on the body, a prime mover, a handle attached to the body and configured to be gripped by a user, a trigger member configured to be operated by the user for driving the prime mover, and a lock member. The handle is configured to shift between a working state and a non-working state.

SUMMARY

The working machine of US Patent Application Publication No. 2019/269073 includes a switch member for determining whether the handle is in the working state or not and a controller configured to control an operation of the prime mover. The controller drives the prime mover when the trigger member is operated by the user in a situation where the controller is receiving from the switch member a signal indicating that the handle is in the working state. The controller does not drive the prime mover when the trigger member is operated by the user in a situation where the controller is not receiving from the switch member the signal indicating that the handle is in the working state. Thus, in the working machine of US Patent Application Publication No. 2019/269073, the switch member is used to prevent the prime mover from being unintentionally driven when the handle is in the non-working state. The configuration using the switch member requires a signal line connected to the switch member, and thus complicates the configuration of the working machine and leads to increased cost.

The disclosure herein provides a technology that prevents a prime mover from being unintentionally driven when a handle is in a non-working state by using a simplified configuration.

A working machine disclosed herein may comprise: a body; a working part disposed on the body; a prime mover; a handle attached to the body and configured to be gripped by a user; a trigger member configured to be operated by the user for driving the prime mover; and a lock member. The handle may be configured to shift between a working state and a non-working state. The lock member may be configured to: move between a non-restriction position and a restriction position, wherein when the lock member is positioned at the non-restriction position, a user's operation on the trigger member is not restricted, and when the lock member is positioned at the restriction position, the user's operation on the trigger member is restricted; be positioned at the non-restriction position when the handle is in the working state, be positioned at the restriction position when the handle is in the non-working state; and move from the non-restriction position to the restriction position in response to shift of the handle from the working state to the non-working state.

According to the configuration above, when the handle is in the working state, the lock member is positioned at the non-restriction position, and thus the user can drive the prime mover by operating the trigger member. On the other hand, when the handle is in the non-working state, the lock member is positioned at the restriction position, and thus the user cannot operate the trigger member and cannot drive the prime mover. Further, the lock member moves from the non-restriction position to the restriction position in response to the shift of the handle from the working state to the non-working state. This prevents the trigger member from being accidentally operated when the handle is in the non-working state. Thus, it is possible to prevent the prime mover from being unintentionally driven when the handle is in the non-working state by using a simple configuration of the lock member.

BRIEF DESCRIPTION OF THE DRAWINGS

FIG. 5 is a cross-sectional view along a line V-V in FIG. 3.

DETAILED DESCRIPTION

Figure 1A:
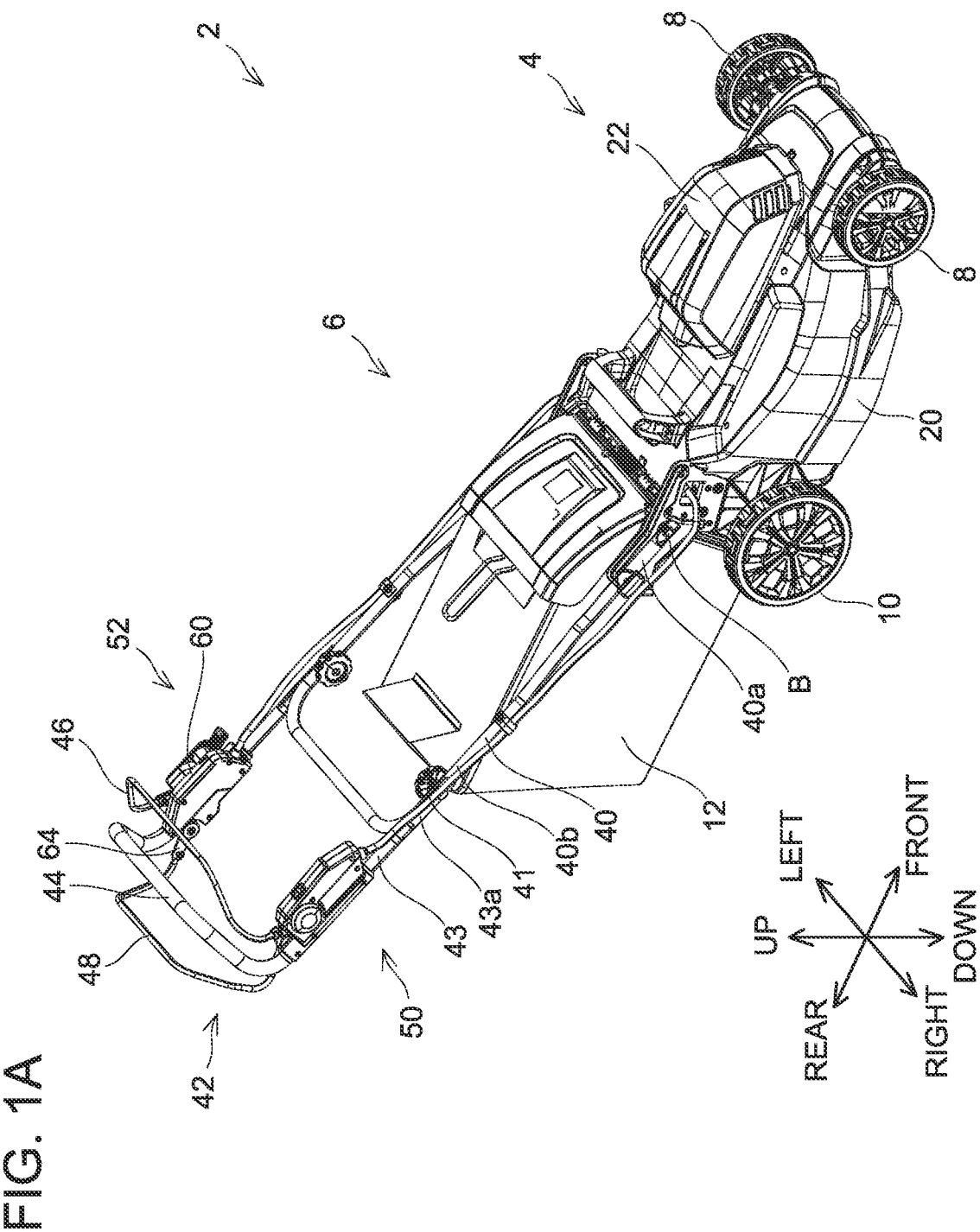
FIG. 1A is a perspective view of a mower 2 according to an embodiment as viewed from the upper right front side, with a handle unit 6 in a working state and a traction switch lever 48 unoperated.
Figure 1B:
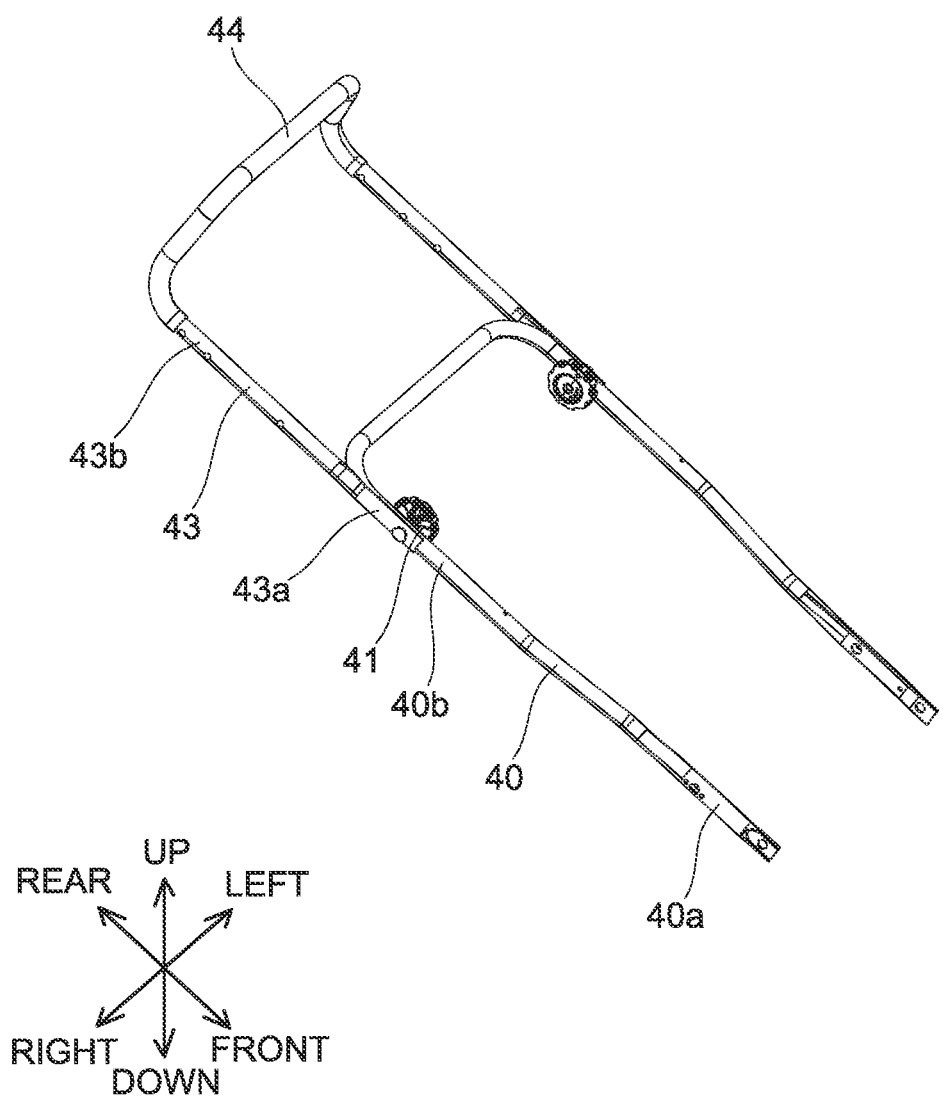
FIG. 1B is a perspective view of a lower arm 40, an upper arm 43, and a grip 44 according to the embodiment as viewed from the upper right front side.

Representative, non-limiting examples of the disclosure herein will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved working machines, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a working machine may comprise: a body; a working part disposed on the body; a prime mover; a handle attached to the body and configured to be gripped by a user; a trigger member configured to be operated by the user for driving the prime mover; and a lock member. The handle may be configured to shift between a working state and a non-working state. The lock member may be configured to: move between a non-restriction position and a restriction position, wherein when the lock member is positioned at the non-restriction position, a user's operation on the trigger member is not restricted, and when the lock member is positioned at the restriction position, the user's operation on the trigger member is restricted; be positioned at the non-restriction position when the handle is in the working state; be positioned at the restriction position when the handle is in the non-working state; and move from the non-restriction position to the restriction position in response to shift of the handle from the working state to the non-working state.

In one or more embodiments, in response to shift of the handle from the non-working state to the working state, the lock member may be configured to move from the restriction position to the non-restriction position.

According to the configuration above, the user can operate the trigger member by shifting the state of the handle from the non-working state to the working state. This improves user convenience as compared to a configuration that requires the user to move the lock member from the restriction position to the non-restriction position after the user has shifted the state of the handle from the non-working state to the working state.

In one or more embodiments, the lock member may be a lock pin configured to move in response to shift of the handle. The handle may comprise a lock groove in which the lock pin slides. At the restriction position, the lock pin may restrict the user's operation on the trigger member by a part of the lock pin projecting from the lock groove, and at the non-restriction position, an entirety of the lock pin may be housed in the lock groove.

According to the configuration above, it is possible to prevent the trigger member from being accidentally operated when the handle is in the non-working state by using a simple member, namely the lock pin. Thus, it is possible to prevent the prime mover from being unintentionally driven when the handle is in the non-working state by using a simple configuration.

In one or more embodiments, when the handle is in the working state, a weight of the lock member may act in a direction in which the lock member moves from the restriction position to the non-restriction position. When the handle is in the non-working state, the weight of the lock member may act in a direction in which the lock member moves from the non-restriction position to the restriction position.

According to the configuration above, when the handle is shifted from the working state to the non-working state, the weight of the lock member acts in the direction in which the lock member moves from the non-restriction position to the restriction position. That is, the lock member automatically moves from the non-restriction position to the restriction position. This eliminates a need for a biasing member to move the lock member from the non-restriction position to the restriction position, for example. Thus, it is possible to prevent the prime mover from being unintentionally driven when the handle is in the non-working state by using a simpler configuration.

In one or more embodiments, at the restriction position, the lock member may directly restrict the user's operation on the trigger member.

For example, it can be considered that the lock member restricts the user's operation on the trigger member by restricting a user's operation on a different member (e.g., a lock-off member) than the lock member. This configuration requires a mechanism that couples the different member with the trigger member, and thus complicates the configuration of the working machine. However, according to the configuration above, there is no need for such a mechanism since the lock member directly restricts the user's operation on the trigger member. Thus, it is possible to prevent the prime mover from being unintentionally driven when the handle is in the non-working state by using a simpler configuration.

In one or more embodiments, the handle may comprise a lock-off member configured to be operated by the user. While the lock-off member is operated by the user, the trigger member may be operable by the user.

According to the configuration above, while the handle is in the non-working state, the user's operation on the trigger member is restricted by the lock member and the lock-off member. Thus, it is possible to surely prevent the prime mover from being unintentionally driven when the handle is in the non-working state.

EMBODIMENTS

Referring to FIGS. 1A to 13, a mower 2 according to an embodiment will be described. The mower 2 operates in contact with the ground. As illustrated in FIGS. 1A to 3, the mower 2 comprises a body unit 4 and a handle unit 6. The body unit 4 comprises a pair of front wheels 8 and a pair of rear wheels 10 (see FIG. 3). The following description will be made in connection with the mower 2 with the pair of front wheels 8 and the pair of rear wheels 10 contacting the ground. A grass container 12 is detachably attached to a rear portion of the body unit 4. The handle unit 6 is attached to an upper rear portion of the body unit 4 and extends from the body unit 4 rearward and upward.

(Configuration of Body Unit 4)

As illustrated in FIG. 1A, the body unit 4 comprises a body housing 20 and a battery cover 22. The battery cover 22 is positioned at an upper portion of the body housing 20. The battery cover 22 is an openable cover. A user can open the battery cover 22 and attach/detach battery packs 24 (see FIG. 13) to/from the body housing 20. In the present embodiment, two battery packs 24 are attached to the body housing 20.

Figure 13:
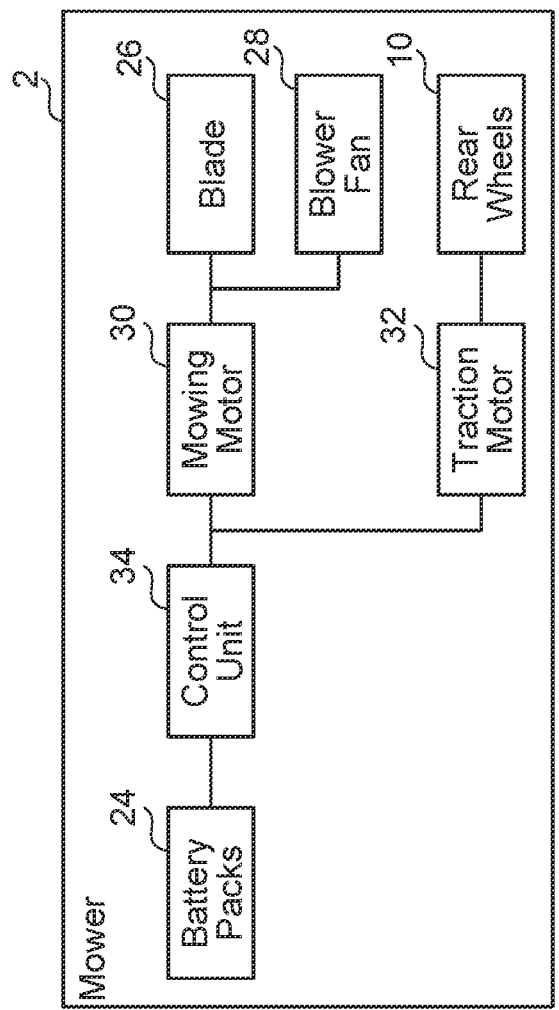
FIG. 13 is a diagram illustrating a control configuration of the mower 2.

The body housing 20 houses a blade 26 (see FIG. 13), a blower fan 28 (see FIG. 13), a mowing motor 30 (sec FIG. 13), a traction motor 32 (see FIG. 13), and a control unit 34 (see FIG. 13). The blade 26 is disposed at a lower portion of the body housing 20 and faces the ground. The blade 26 and the blower fan 28 are connected to the mowing motor 30 via a drive shaft (not illustrated) extending in an up-down direction. When the mowing motor 30 is driven, the blade 26 and the blower fan 28 are rotated. The blade 26 thereby cuts grass on the ground. The cut grass is transferred to the grass container 12 by an air flow generated by the rotation of the blower fan 28. The rear wheels 10 are connected to reduction gears (not illustrated) via a first shaft (not illustrated) extending in a left-right direction. The reduction gears are connected to a second shaft (not illustrated) connected to the traction motor 32. When the traction motor 32 is driven, the rear wheels 10 are rotated. The mower 2 thereby moves forward. The control unit 34 controls operations of the mowing motor 30 and the traction motor 32 by controlling electric power supplied from the battery packs 24 to the mowing motor 30 and the traction motor 32. The mowing motor 30 and the traction motor 32 each may be a brushless DC motor, a brush DC motor, or a motor of another type such as an AC motor.

(Configuration of Handle Unit 6)

As illustrated in FIG. 1A, the handle unit 6 comprises a lower arm 40 and a grip unit 42. Base end portions 40a of the lower arm 40 (end portions closer to the body unit 4) are fixed to the body housing 20 of the body unit 4 with screws B. As illustrated in FIG. 1A, the grip unit 42 is fixed to distal end portions 40b of the lower arm 40 (end portions farther from the body unit 4) with tabs 41.

As illustrated in FIGS. 1A to 3, the grip unit 42 comprises an upper arm 43 (see FIG. 1B), a grip 44, a mowing switch lever 46, a fraction switch lever 48, a right switch unit 50, and a left switch unit 52. As illustrated in FIG. 1B, base end portions 43a of the upper arm 43 (end portions closer to the body unit 4) are fixed to the distal end portions 40b of the lower arm 40 with the tabs 41. The grip 44 is fixed to distal end portions 43b of the upper arm 43 (end portions farther from the body unit 4). As illustrated in FIG. 1A, the right switch unit 50 and the left switch unit 52 are fixed to the upper arm 43. The mowing switch lever 46 and the traction switch lever 48 are pivotably attached to the right switch unit 50 and the left switch unit 52.

Figure 2:
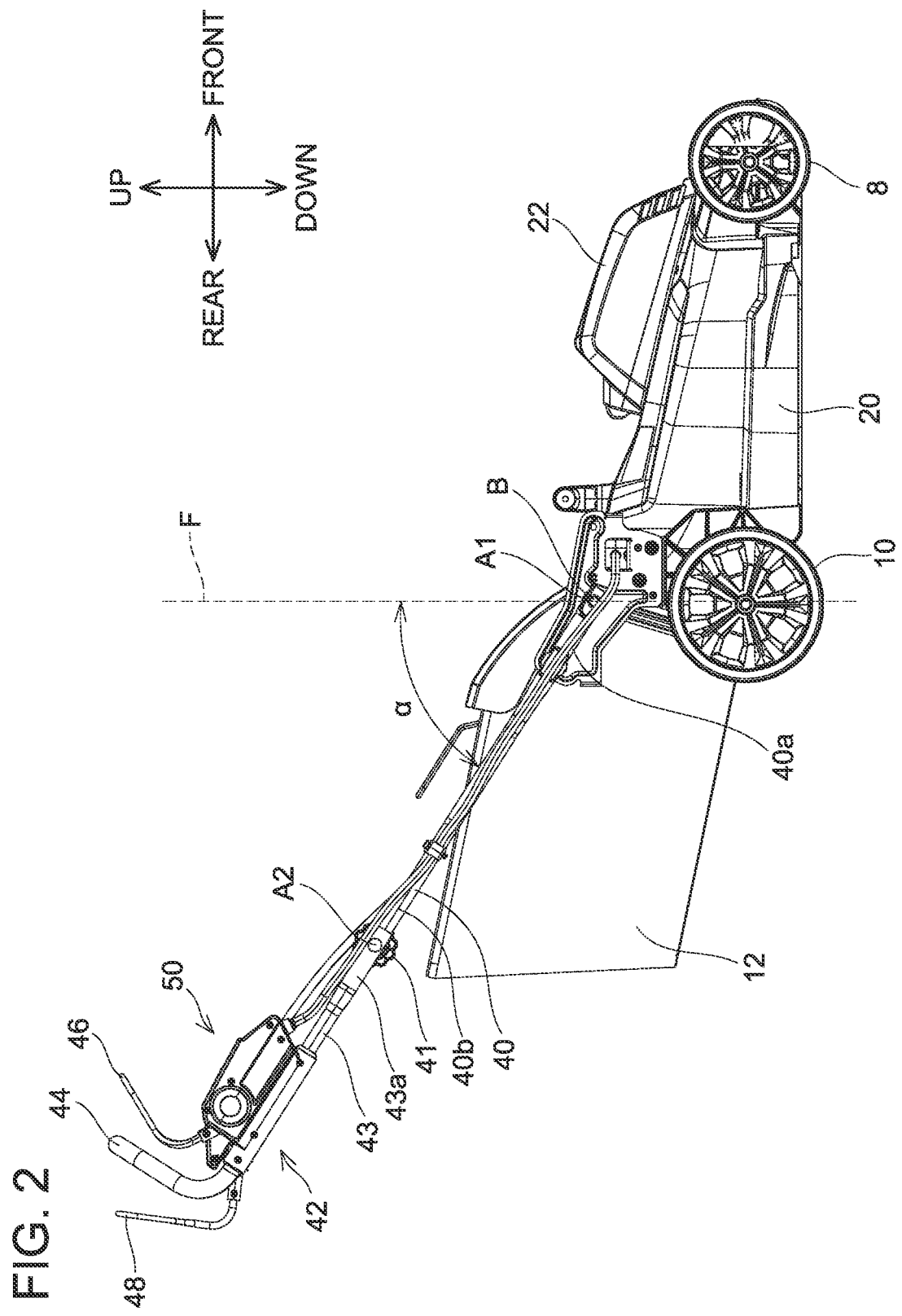
FIG. 2 is a right side view of the mower 2 in the state of FIG. 1A.
Figure 3:
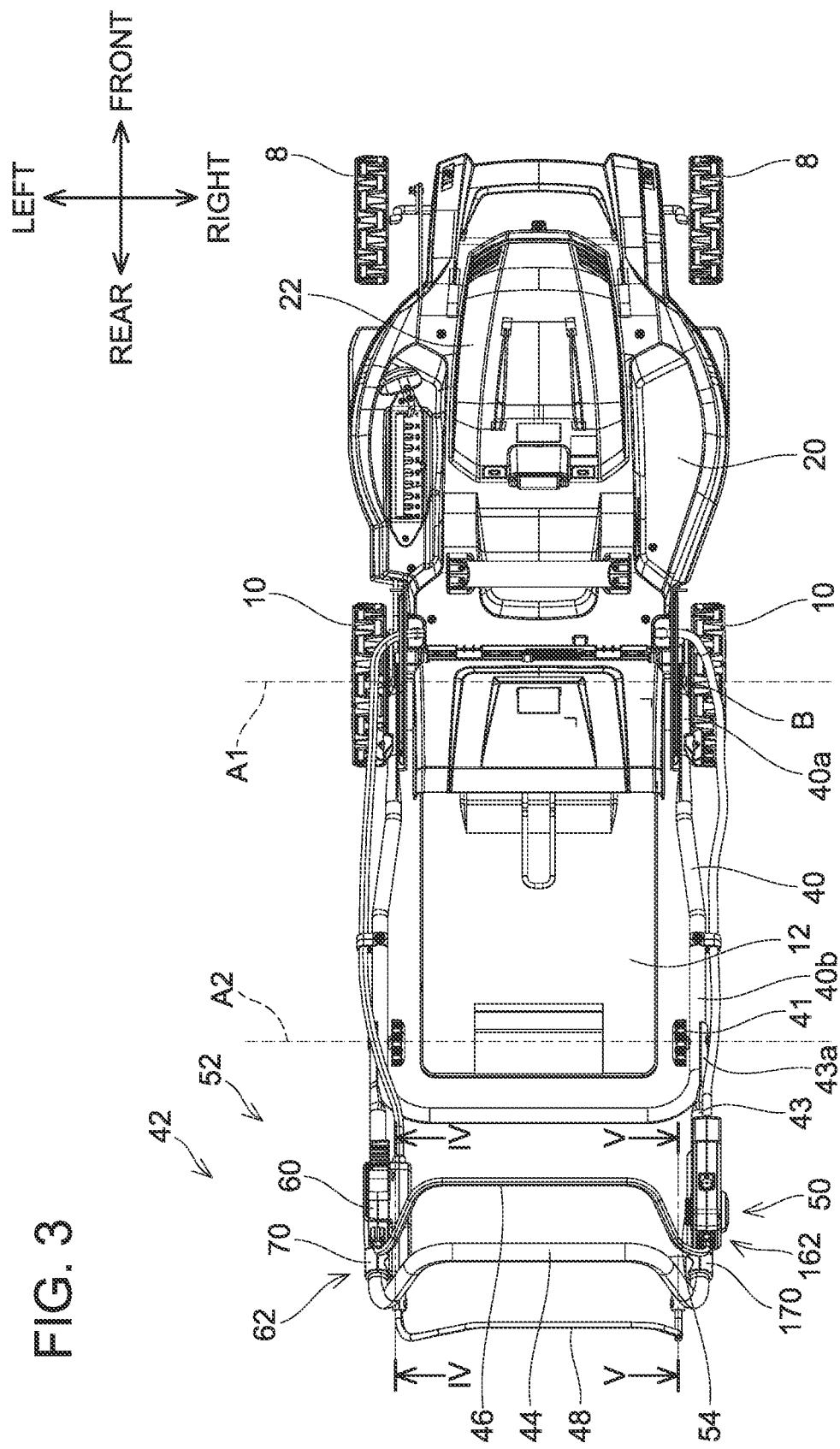
FIG. 3 is a top view of the mower 2 in the state of FIG. 1A.

As illustrated in FIGS. 2 and 3, the handle unit 6 can pivot about a pivot axis A1, which extends in the left-right direction, with respect to the body housing 20 when the screws B are loosened. Further, the upper arm 43 of the handle unit 6 can pivot about a pivot axis A2, which extends in the left-right direction, with respect to the lower arm 40 when the tabs 41 are loosened. The user can shift the handle unit 6 between a state in which the handle unit 6 is at a position suitable for mowing (hereinafter, termed "working state") and a state in which the handle unit 6 is at a position unsuitable for mowing (hereinafter, termed "non-working state"). As illustrated in FIG. 2, it is intended that the mower 2 according to the present embodiment mows with the upper arm 43 tilted such that the distal end portions 43b (see FIG. 1B) of the upper arm 43 is positioned rearward of and above the base end portions 43a. Specifically, in the present embodiment, a tilt angle α of the upper arm 43 being larger than a predetermined angle (e.g., 10°) (e.g., the state illustrated in FIGS. 1A, 2, 3, 6) is a state suitable for mowing (i.e., working state). The tilt angle α is an angle by which the upper arm 43 is tilted rearward with respect to a plane F that includes the pivot axis A1 and extends in the up-down direction. Further, the tilt angle α of the upper arm 43 being equal to or smaller than the predetermined angle (e.g., the state illustrated in FIGS. 8, 10) is a state unsuitable for mowing (i.e., non-working state), in FIGS. 8 and 10, the tilt angle α is "−90°". Further, the upper arm 43 being tilted with respect to the lower arm 40 when the lower arm 40 is in the state illustrated in FIGS. 1A and 2 is also the non-working state, although this is not illustrated.

The mowing switch lever 46 is biased to be away forward from the grip 44 by a spring (not illustrated) housed in the left switch unit 52. As illustrated in FIG. 3, a lock-off button 54 is positioned at the right switch unit 50. The lock-off button 54 is a button for putting restriction on an operation on the mowing switch lever 46 and releasing the restriction on the operation. When the lock-off button 54 is not pushed in, the operation on the mowing switch lever 46 is restricted. The restriction on the operation on the mowing switch lever 46 is released by the lock-off button 54 being pushed in. Further, the right switch unit 50 houses a mowing switch mechanism (not illustrated) that detects the operation on the mowing switch lever 46. When the user operates the mowing switch lever 46 with the left hand while pushing in the lock-off button 54 with the right hand, the mowing switch mechanism detects the operation on the mowing switch lever 46. Then, a signal that is indicative of the detection of the operation on the mowing switch lever 46 is sent to the control unit 34 (see FIG. 13). The mowing motor 30 is then driven by the control unit 34, and the blade 26 and blower fan 28 are thereby rotated. When the user stops operating the mowing switch lever 46, the mowing motor 30 is stopped by the control unit 34, and the blade 26 and the blower fan 28 are thereby stopped.

Next, connection between the traction switch lever 48, the right switch unit 50, and the left switch unit 52 will be described.

Figure 4:
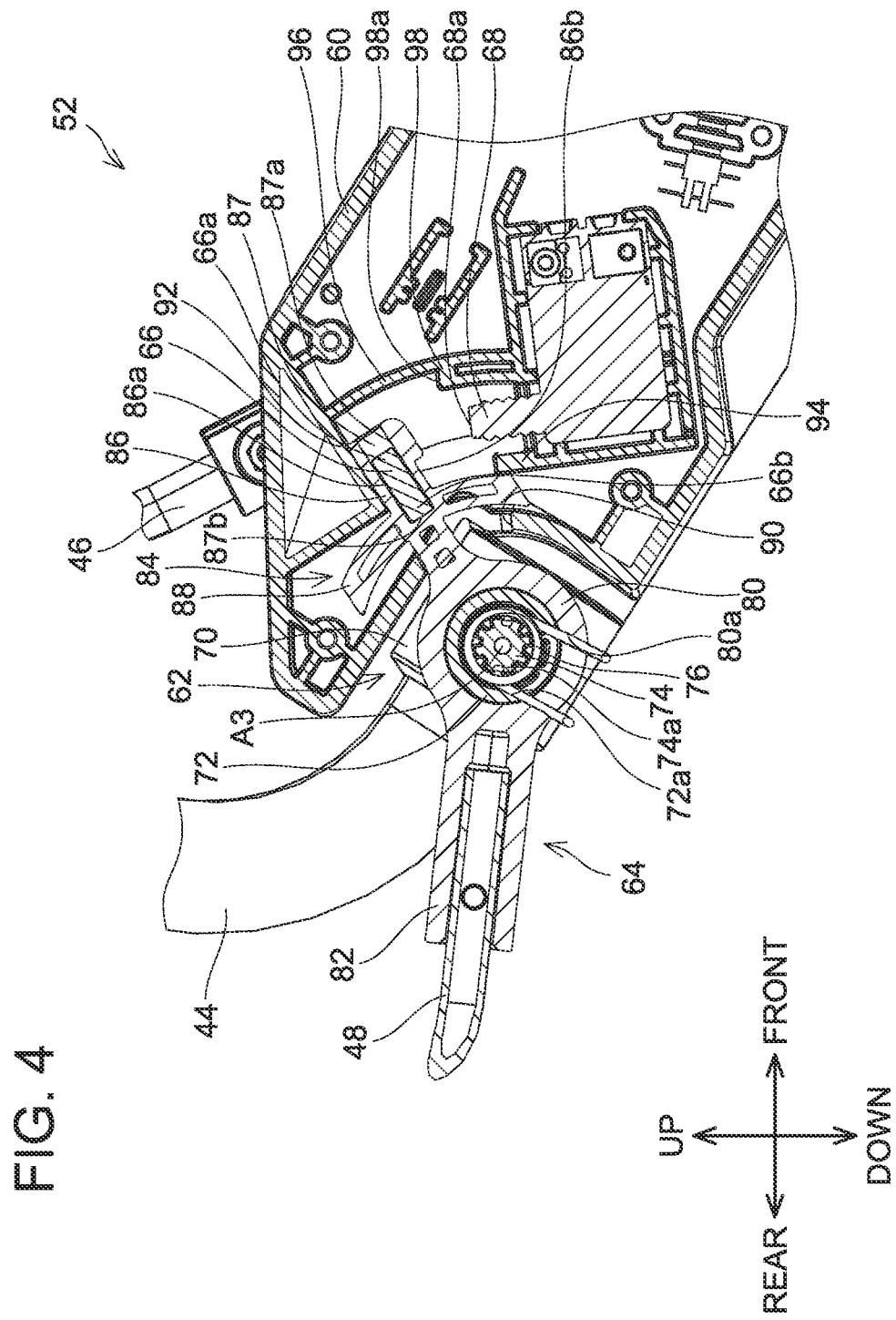
FIG. 4 is a cross-sectional view along a line IV-IV in FIG. 3.

As illustrated in FIG. 4, the left switch unit 52 comprises a switch housing 60, a coupling unit 62, a pivot unit 64, a lock pin 66, and a traction switch mechanism 68. The traction switch mechanism 68 is a mechanism that detects an operation on the traction switch lever 48. As illustrated in FIGS. 3 and 4, the coupling unit 62 comprises a coupling portion 70 coupling the grip 44 with the switch housing 60, a first projection 72 having a hollow cylinder shape, a second projection 74, and a biasing member 76. The first projection 72 and the second projection 74 extend rightward from the coupling portion 70. The second projection 74 is positioned within the first projection 72. The second projection 74 includes, on its outer surface, a plurality of projections 74a projecting radially outward. The biasing member 76 is interposed between the first projection 72 and the second projection 74. The biasing member 76 is, for example, a torsion spring. An opening 72a is defined in the first projection 72. A part of the biasing member 76 extends to the outside through the opening 72a. The biasing member 76 biases the pivot unit 64 in the counterclockwise direction in FIG. 4 with respect to the switch housing 60.

Figure 9:
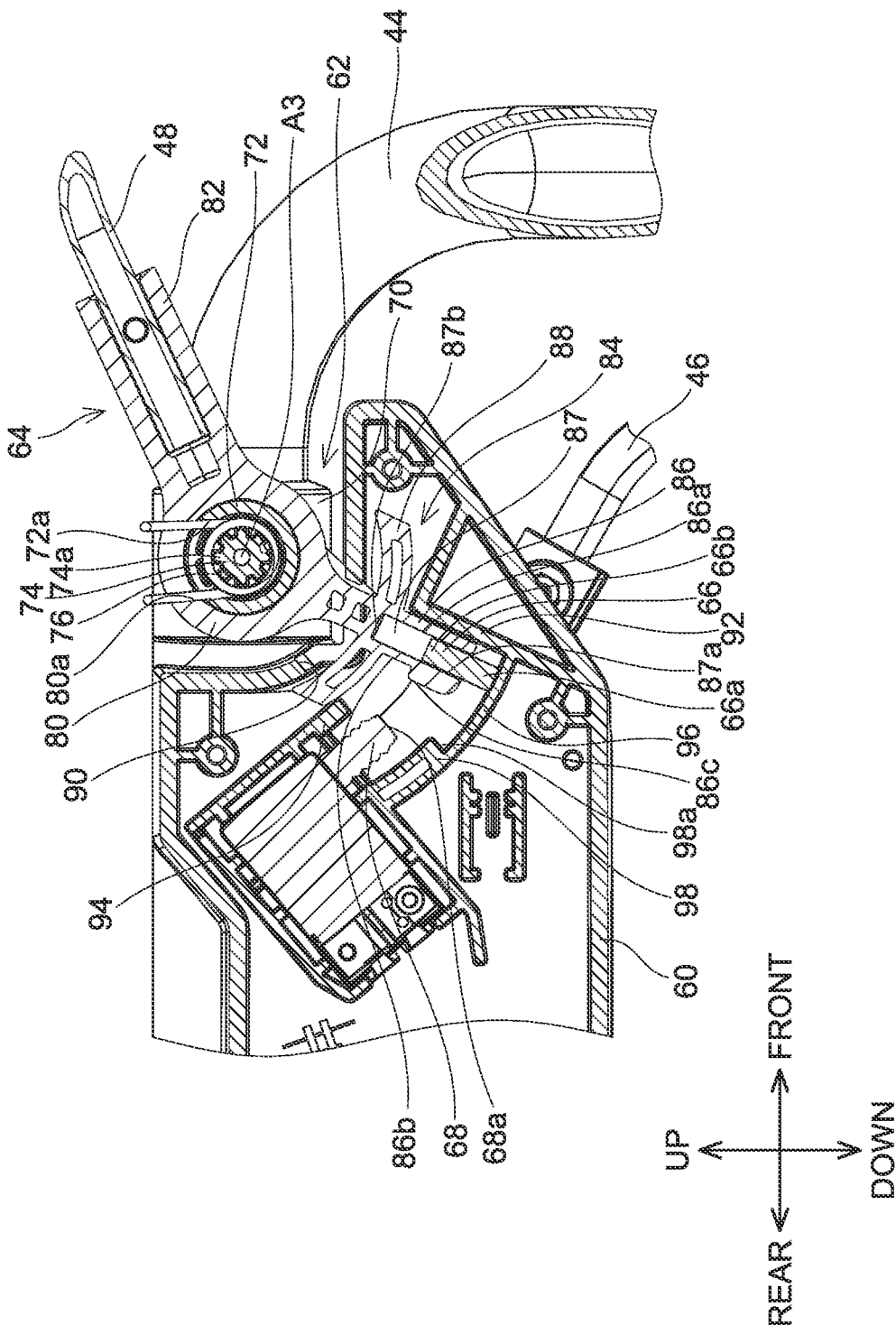
FIG. 9 is a right cross-sectional view of the mower 2 in the state of FIG. 8.
Figure 11:
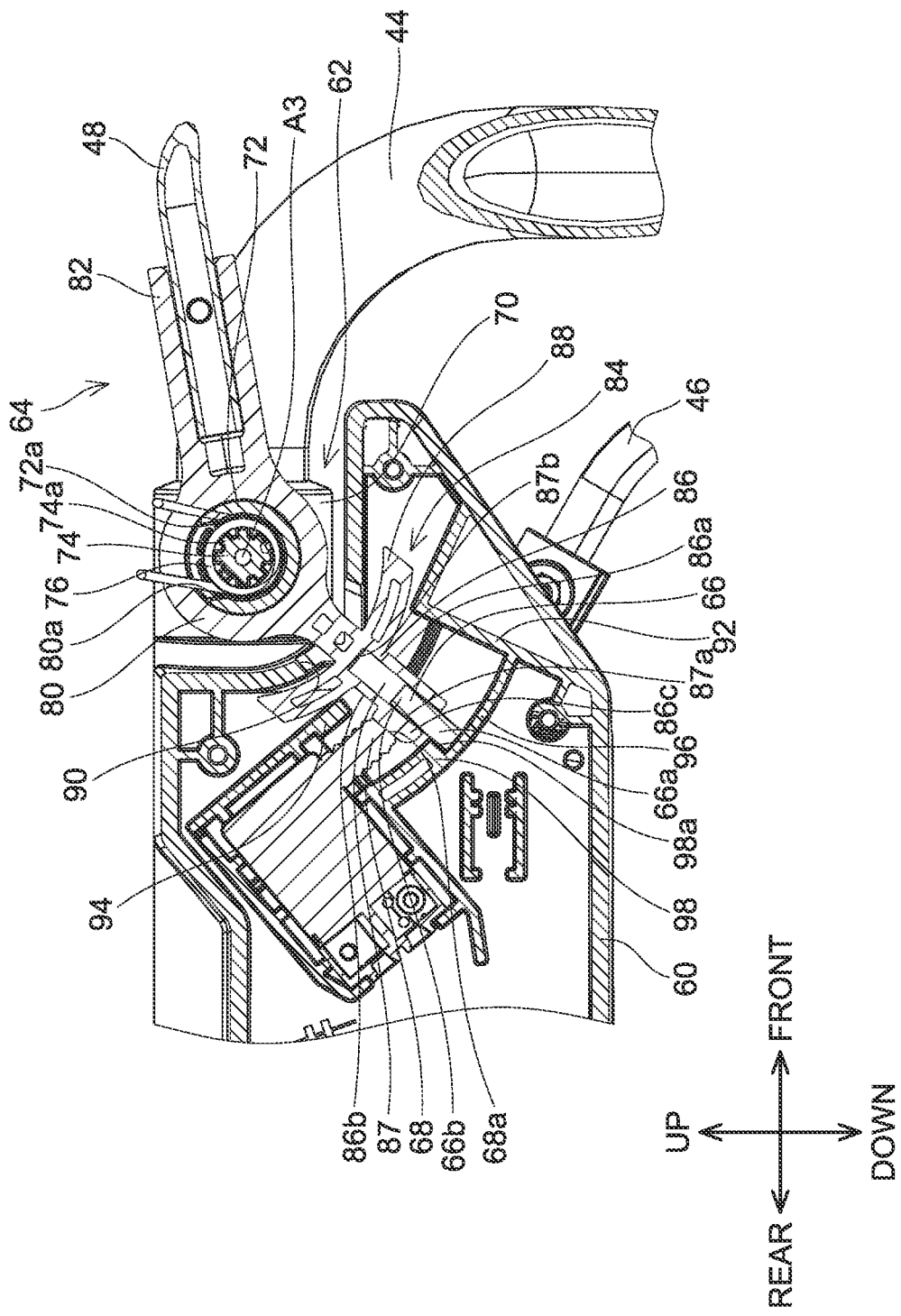
FIG. 11 is a right cross-sectional view of the mower 2 in the state of FIG. 10.
Figure 12:
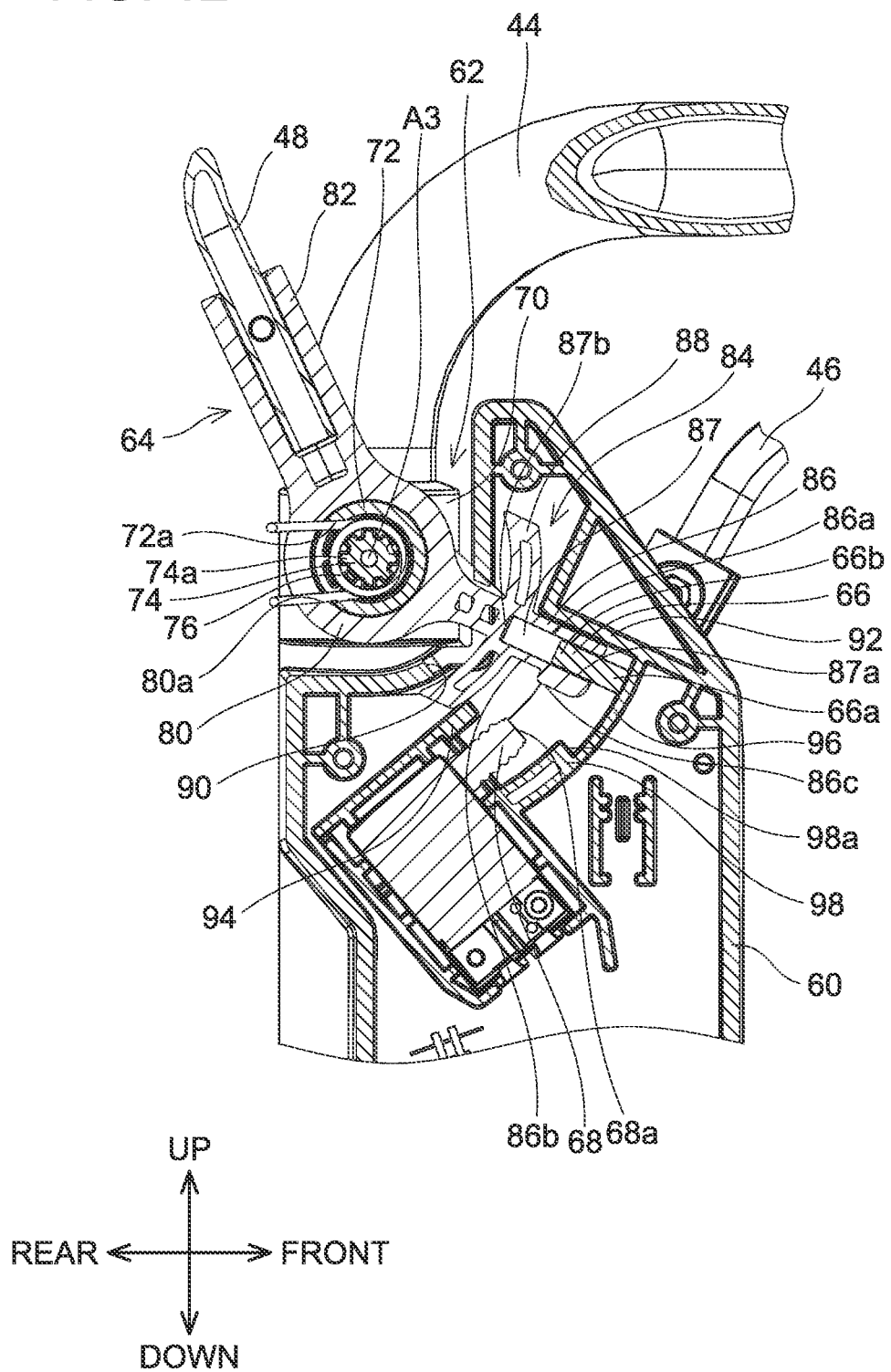
FIG. 12 is a right cross-sectional view of the mower 2 according to the embodiment, with a longitudinal direction of the handle unit 6 parallel to a plane F and the traction switch lever 48 unoperated.

As illustrated in FIG. 4, the pivot unit 64 is attached to the first projection 72 such that it is pivotable about a pivot axis A3 extending in the left-right direction. The pivot unit 64 comprises a cylindrical portion 80, a switch lever connecting portion 82 connected to the cylindrical portion 80, and a switch operation unit 84 connected to the cylindrical portion 80. The inner diameter of the cylindrical portion 80 is slightly larger than the outer diameter of the first projection 72. An opening 80a is defined in the cylindrical portion 80 such that it is positioned outward of the opening 72a of the first projection 72 in a radial direction of the cylindrical portion 80. A part of the biasing member 76 extends to the outside through the opening 80a. The traction switch lever 48 is connected to the switch lever connecting portion 82. The switch operation unit 84 comprises an extension 86 extending radially outward from the cylindrical portion 80 and a flange 88 extending in a circumferential direction of the cylindrical portion 80 from an intermediate portion of the extension 86. A lock groove 87 extending in an extending direction of the extension 86 (i.e., in the radial direction of the cylindrical portion 80) is defined in the extension 86. The lock groove 87 comprises an opening 87a and a bottom 87b opposite to the opening 87a. The lock pin 66 is housed in the lock groove 87 such that it is slidable in the radial direction of the cylindrical portion 80. The lock pin 66 may have a solid cylinder shape or a prism shape. Although details will be described later, the lock pin 66 is configured to move between a non-restriction position at which the entirety of the lock pin 66 is housed in the lock groove 87 (see FIGS. 4, 7) and a restriction position at which a part of the lock pin 66 projects from the opening 87a to the outside of the lock groove 87 (see FIGS. 9, 11, 12). In response to the user operating the traction switch lever 48, the pivot unit 64 pivots about the pivot axis A3. The biasing member 76 biases the pivot unit 64 from the non-restriction position (FIGS. 4, 7) toward the restriction position (FIGS. 9, 11, 12).

Figure 7:
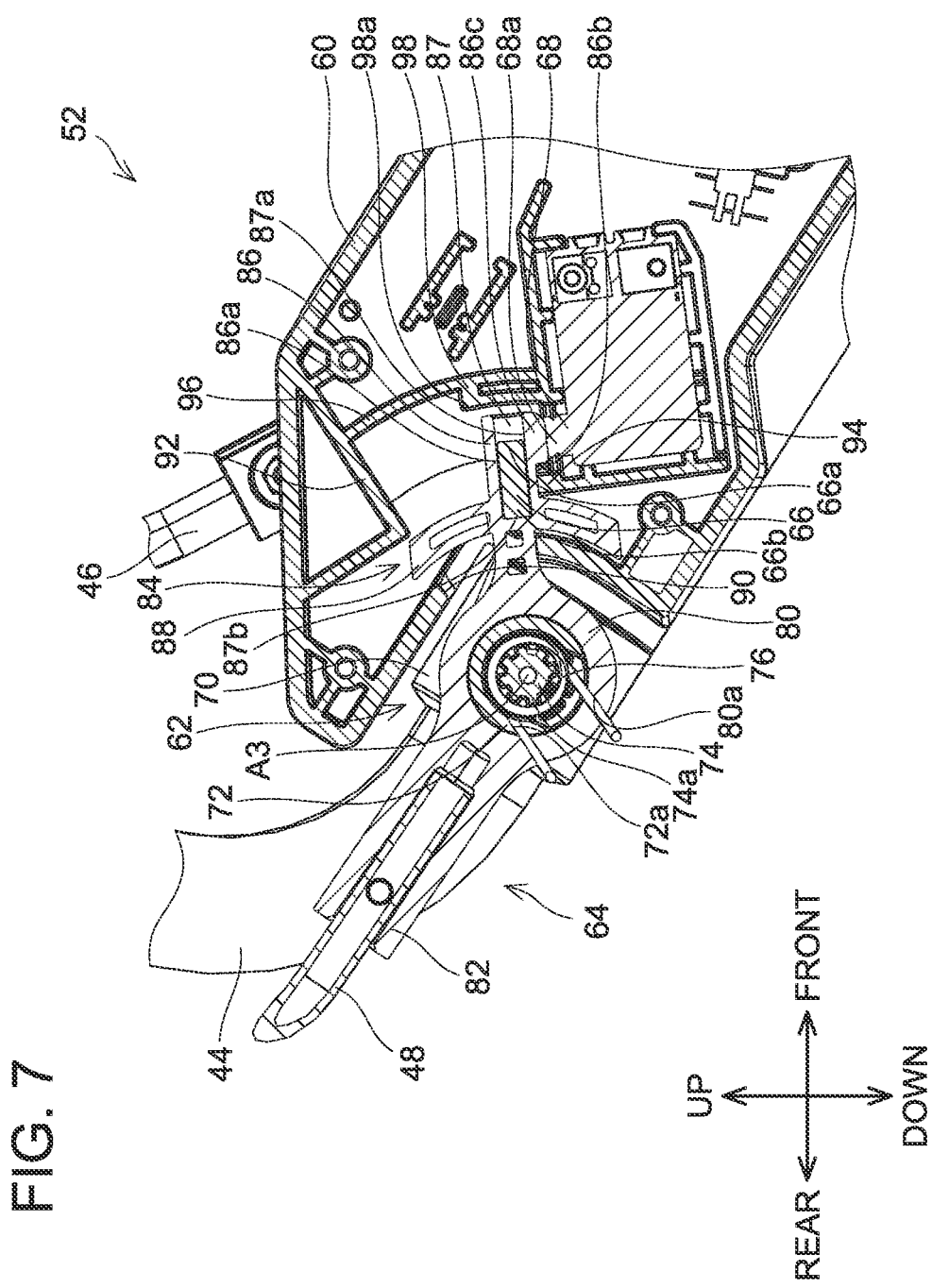
FIG. 7 is a right cross-sectional view of the mower 2 in the state of FIG. 6.

Referring to FIGS. 4 and 7, the switch housing 60 will be described. As illustrated in FIG. 4, an opening 90 is defined in a rear portion of the switch housing 60 and the extension 86 passes through the opening 90. The switch housing 60 includes a first wall 92, a second wall 94, a third wall 96, and a fourth wall 98 therein. In the state where the traction switch lever 48 is not operated (in the state illustrated in FIG. 4), the first wall 92 is in contact with a first outer surface 86a of the extension 86. In the state where the traction switch lever 48 is operated (in the state illustrated in FIG. 7), the second wall 94 is in contact with a second outer surface 86b of the extension 86. A projection 86c projecting toward the traction switch mechanism 68 is positioned on the second outer surface 86b of the extension 86. The third wall 96 and the fourth wall 98 are positioned outward of the extension 86 in the radial direction of the cylindrical portion 80 and each have a shape conforming to the circumference of the cylindrical portion 80. The fourth wall 98 is positioned inward of the third wall 96 in the radial direction of the cylindrical portion 80. In the circumferential direction of the cylindrical portion 80, an angle between the first wall 92 and an end 98a of the fourth wall 98 is smaller than an angle between the first wall 92 and an end 68a of the traction switch mechanism 68.

As illustrated in FIG. 5, the right switch unit 50 comprises a coupling unit 162 and a pivot unit 164. The coupling unit 162 comprises a coupling portion 170 coupling the grip 44 with the right switch unit 50, a first projection 172 having a hollow cylinder shape, and a second projection 174. The first projection 172 and the second projection 174 extend leftward from the coupling portion 170. The second projection 174 is positioned within the first projection 172. The configuration of the second projection 174 is the same as that of the second projection 74 (see FIG. 4) of the left switch unit 52. An opening 172a is defined in the first projection 172. The pivot unit 164 is attached to the first projection 172 such that it is pivotable about the pivot axis A3. The pivot unit 164 comprises a cylindrical portion 180 and a switch lever connecting portion 182 connected to the cylindrical portion 180. The inner diameter of the cylindrical portion 180 is slightly larger than the outer diameter of the first projection 172. The traction switch lever 48 is connected to the switch lever connecting portion 182. In response to the user operating the traction switch fever 48, the pivot unit 164 pivots about the pivot axis A3.

Figure 6:
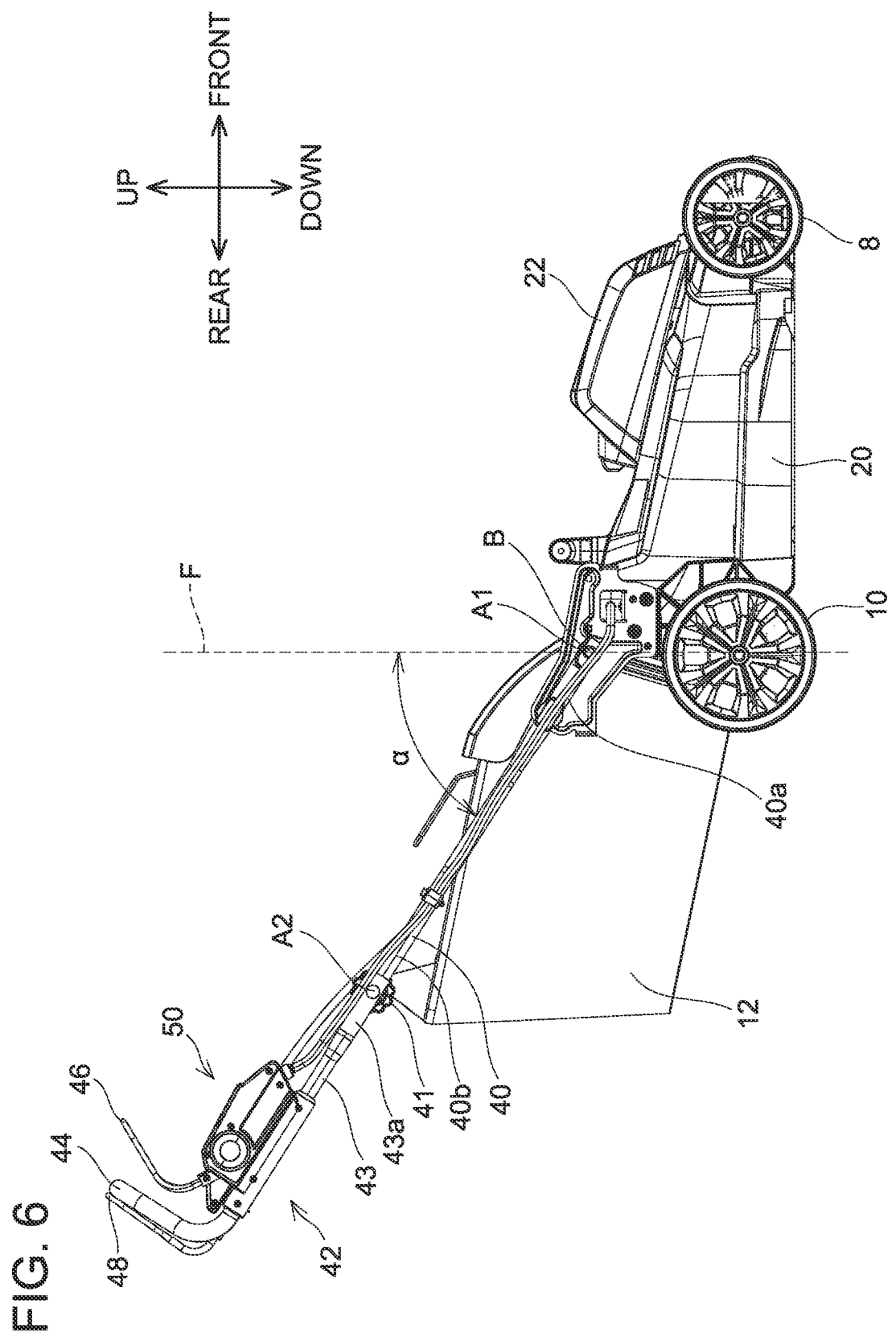
FIG. 6 is a right side view of the mower 2 according to the embodiment with the handle unit 6 in the working state and the traction switch lever 48 operated.

When the traction switch lever 48 is not operated by the user (i.e., in the stare illustrated in FIGS. 1A, 2, 3), the traction switch lever 48 is biased to be away rearward from the grip 44 by the left switch unit 52 (specifically, by the biasing member 76). When the user pushes the traction switch lever 48 toward the grip 44, the pivot units 64, 164 pivot about the pivot axis A3. Specifically, at the pivot unit 64 in FIG. 4, the switch lever connecting portion 82 pivots upward, and the extension 86 pivots downward (see FIG. 4). As a result, the traction switch lever 48 contacts the grip 44 as illustrated in FIG. 6 and further the projection 86c of the extension 86 pushes the end 68a of the traction switch mechanism 68 downward as illustrated in FIG. 7. The left switch unit 52 thus detects the operation performed on the traction switch lever 48 and sends a corresponding signal to the control unit 34 (see FIG. 13). Then, the traction motor 32 is driven by the control unit 34, and the rear wheels 10 are thereby rotated. When the user stops operating the traction switch lever 48, the traction motor 32 is stopped by the control unit 34, and the rotation of the rear wheels 10 is thereby stopped.

(Positions of Lock Pin 66)

Referring to FIGS. 4, 9, and 12, positions the lock pin 66 can take when the handle unit 6 is tilted toward the body unit 4 by the user will be described. FIG. 12 illustrates a right cross-sectional view of the mower 2 at the timing when a longitudinal axis of the handle unit 6 becomes parallel to the plane F (see FIG. 2) while the handle unit 6 is tilted toward the body unit 4. In this state, the tilt angle α of the upper arm 43 (0°) is equal to or less than the predetermined angle, and thus the handle unit 6 is in the non-working state.

The lock pin 66 includes a first end 66a and a second end 66b opposite to the first end 66a, and the first end 66a is positioned outward of the second end 66b in the radial direction of the cylindrical portion 80. In the state illustrated in FIG. 4, the lock pin 66 is inclined such that the first end 66a is positioned above the second end 66b. The lock groove 87 is inclined such that the opening 87a is positioned above the bottom 87b. In this state, the weight of the lock pin 66 acts in a direction in which, the lock pin 66 moves from the opening 87a to the bottom 87b of the lock groove 87. Thus, the second end 66b of the lock pin 66 contacts the bottom 87b of the lock groove 87. Accordingly, the entirety of the lock pin 66 is housed in the lock groove 87. That is, when the handle unit 6 is in the working state, the lock pin 66 is at the non-restriction position. When the handle unit 6 is at the position illustrated in FIGS. 1A, 2, and 3, the lock pin 66 is at the non-restriction position regardless of whether the traction switch lever 48 is being operated or not.

In the state illustrated in FIG. 12, the lock pin 66 is inclined such that the first end 66a is positioned below the second end 66b. The lock groove 87 is inclined such that the opening 87a is positioned below the bottom 87b. In this state, the weight of the lock pin 66 acts in a direction in which the lock pin 66 moves from the bottom 87b toward the opening 87a of the lock groove 87. Thus, a part of the lock pin 66 projects from the lock groove 87 and the first end 66a of the lock pin 66 contacts the third wall 96 of the switch housing 60. That is, when the handle unit 6 is in the non-working state, the lock pin 66 is at the restriction position. When the longitudinal axis of the handle unit 6 is parallel to the plane F (see FIG. 2), the lock pin 66 is at the restriction position regardless of whether the traction switch lever 48 is being operated or not.

In the state illustrated in FIG. 9, the lock pin 66 is inclined such that the first end 66a is positioned below the second end 66b. The lock groove 87 is inclined such that the opening 87a is positioned below the bottom 87b. In this state, the weight of the lock pin 66 acts in a direction in which the lock pin 66 moves from the bottom 87b toward the opening 87a of the lock groove 87. Thus, as with the case in FIG. 12, a part of the lock pin 66 projects front the lock groove 87 and the first end 66a of the lock pin 66 contacts the third wall 96 of the switch housing 60. That is, the lock pin 66 is at the restriction position. When the handle unit 6 is at the position illustrated in FIG. 8, the lock pin 66 is at the restriction position regardless of whether the traction switch lever 48 is being operated or not.

As above, the lock pin 66 is at the non-restriction position when the handle unit 6 is in the working state. Further, the lock pin 66 is at the restriction position when the handle unit 6 is in the non-working state. The lock pin 66 automatically moves from the non-restriction position to the restriction position by the handle unit 6 shifting from the working state to the non-working state. Further, the lock pin 66 automatically moves from the restriction position to the non-restriction position by the handle unit 6 shifting from the non-working state to the working state.

(Effects of Lock Pin 66)

Figure 10:
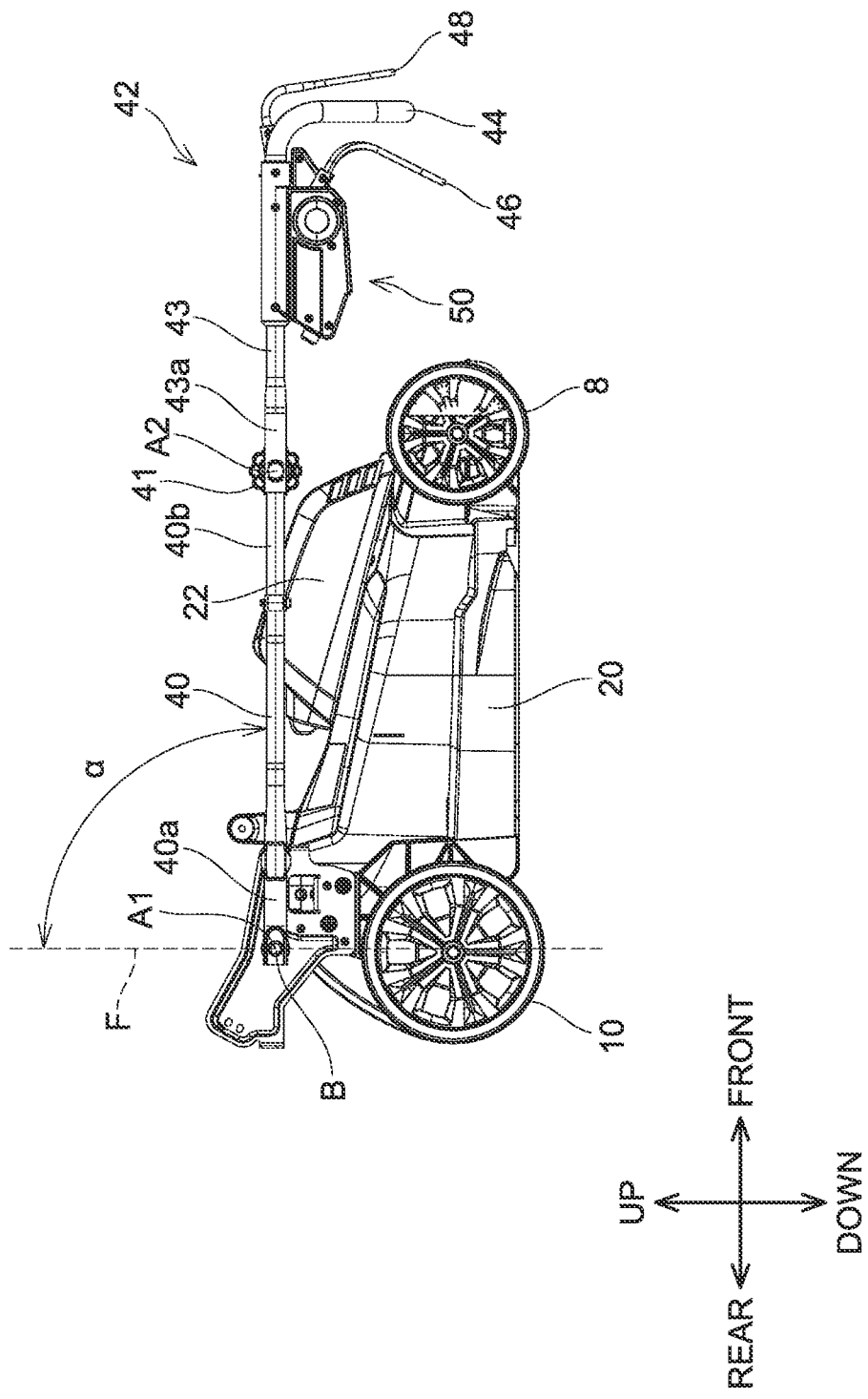
FIG. 10 is a right side view of the mower 2 according to the embodiment with the grass container 12 removed, the handle unit 6 in the non-working state, and the traction switch lever 48 operated.

Effects of the lock pin 66 will be described. As described, when the handle unit 6 is in the working state, the lock pin 66 is at the non-restriction position. In this case, when the traction switch lever 48 is operated by the user as illustrated in FIGS. 6 and 7, the pivot unit 64 pivots about the pivot axis A3 and the projection 86c of the extension 86 pushes the end 68a of the traction switch mechanism 68 downward. As a result, the traction motor 32 is driven by the control unit 34, and the rear wheels 10 are thereby rotated. On the other hand, when the handle unit 6 is in the non-working state, the lock pin 66 is at the restriction position. In this case, when the traction switch lever 48 is operated by the user as illustrated in FIGS. 10 and 11, the pivot unit 64 pivots about the pivot axis A3 and the lock pin 66 contacts the end 98a of the fourth wall 98. That is, as illustrated in FIG. 10, the traction switch lever 48 is stopped before contacting the grip 44. Further, although the projection 86c of the extension 86 slightly pushes the end 68a of the traction switch mechanism 68 as illustrated in FIG. 11, the left switch unit 52 does not detect the operation performed on the traction switch lever 48. Thus, the left switch unit 52 does not send to the control unit 34 the signal indicative of the detection of operation performed on the traction switch lever 48. Therefore, the traction motor 32 and the rear wheels 10 are not driven.

When the handle unit 6 is in the non-working state, the probability that the user wishes to move the mower 2 forward is low. Especially, when the handle unit 6 is completely tilted with respect to the body housing 20 as illustrated in FIG. 10, the mower 2 is in a storage state. In this state, the traction switch lever 48 is positioned forward of the body housing 20, the mowing switch lever 46, etc. That is, the traction switch lever 48 is positioned at the forefront of the mower 2. Thus, the user may accidentally touch the traction switch lever 48 without intention of operating the mower 2. In the present embodiment, as illustrated in FIG. 11, the lock pin 66 is at the restriction position when the handle unit 6 is in the non-working state. Thus, even when the user accidentally touches the traction switch lever 48, the left switch unit 52 does not detect the operation performed on the traction switch lever 48. Thus, unintentional movement of the mower 2 can be prevented.

Effects of Present Embodiment

Figure 8:
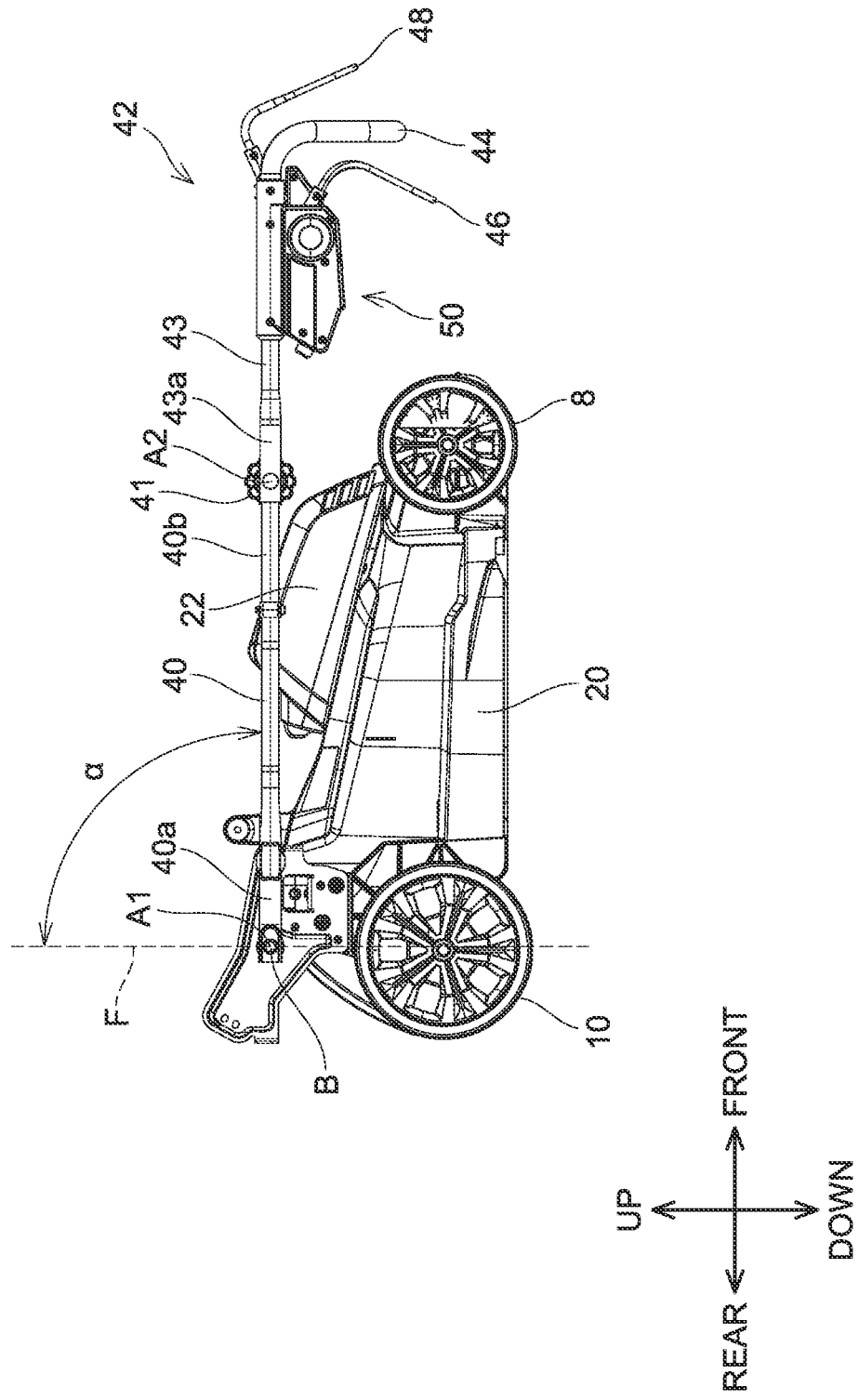
FIG. 8 is a right side view of the mower 2 according to the embodiment with a grass container 12 removed, the handle unit 6 in a non-working state, and the traction switch lever 48 unoperated.

In one embodiment, as illustrated in FIGS. 1A to 13, the mower 2 comprises the body housing 20, the blade 26 disposed on the body housing 20, the traction motor 32, the handle unit 6 attached to the body housing 20 and configured to be gripped by a user, the traction switch lever 48 configured to be operated by the user for driving the traction motor 32, and the lock pin 66. The handle unit 6 is configured to shift between the working state and the non-working state. The lock pin 66 is configured to move between the non-restriction position (see FIGS. 4, 7) and the restriction position (see the FIGS. 9, 11, 12), wherein when the lock pin 66 is positioned at the non-restriction position, a user's operation on the traction switch lever 48 is not restricted, and when the lock pin 66 is positioned at the restriction position, the user's operation on the traction switch lever 48 is restricted. The lock pin 66 is configured to be positioned at the non-restriction position when the handle unit 6 is in the working state (FIGS. 1A, 2, 3, 6) and be positioned at the restriction position when the handle unit 6 is in the non-working state (FIGS. 8, 10). The lock pin 66 is configured to move from the non restriction position to the restriction position in response to the shift of the handle unit 6 from the working state to the non-working state. According to this configuration, when the handle unit 6 is in the working state, the lock, pin 66 is positioned at the non-restriction position, and thus the user can drive the traction motor 32 by operating the traction switch lever 48. On the other hand, when the handle unit 6 is in the non-working state, the lock pin 66 is positioned at the restriction position, and thus the user cannot operate the traction switch lever 48 and cannot drive the traction motor 32. Further, the lock pin 66 moves from the non-restriction position to the restriction position in response to the shift of the handle unit 6 from the working state to the non-working state. This prevents the traction switch lever 48 from being accidentally operated when the handle unit 6 is in the non-working state. Thus, it is possible to prevent the traction motor 32 from being unintentionally driven when the handle unit 6 is in the non-working state by using a simplified configuration of the lock pin 66.

In the mower 2 according to one embodiment, as illustrated in FIGS. 4, 9, and 12, the lock pin 66 is configured to move from the restriction position to the non-restriction position in response to the shift of the handle unit 6 from the non-working state to the working state. According to this configuration, the user cart operate the traction switch lever 48 by shifting the state of the handle unit 6 from the non-working state to the working state. This improves user convenience as compared to a configuration that requires the user to move the lock pin 66 from the restriction position to the non-restriction position after the user has shifted the state of the handle unit 6 from the non-working state to the working state.

In the mower 2 according to one embodiment, as illustrated in FIG. 4, the handle unit 6 comprises the lock groove 87 in which the lock pin 66 fits. As illustrated in FIG. 11, at the restriction position, the lock pin 66 restricts the user's operation on the traction switch lever 48 by a part of the lock pin 66 projecting from the lock groove 87. As illustrated in FIGS. 4 and 7, at the non-restriction position, the entirety of the lock pin 66 is housed in the lock groove 87. According to this configuration, it is possible to prevent the traction switch lever 48 from being accidentally operated when the handle unit 6 is in the non-working state by using a simple member of the lock pin 66. Thus, it is possible to prevent the traction motor 32 from being unintentionally driven when the handle unit 6 is in the non-working state by using a simpler configuration.

In the mower 2 according to one embodiment, as illustrated in FIG. 4, when the handle unit 6 is in the working state, the weight of the lock pin 66 acts in the direction in which the lock pin 66 moves from the restriction position to the non-restriction position. As illustrated in FIGS. 9 and 12, when the handle unit 6 is in the non-working state, the weight of the lock pin 66 acts in the direction in which the lock pin 66 moves from the non-restriction position to the restriction position. According to this configuration, when the handle unit 6 is shifted from the working state to the non-working state, the weight of the lock pin 66 acts in the direction in which the lock pin 66 moves from the non-restriction position to the restriction position. That is, the lock, pin 66 automatically moves from the non-restriction position to the restriction position. This eliminates a need for a biasing member to move the lock pin 66 from the non-restriction position to the restriction position, for example. Thus, it is possible to prevent the traction motor 32 from being unintentionally driven when the handle unit 6 is in the non-working state by using a simpler configuration.

In the mower 2 according to one embodiment, as illustrated in FIG. 11, at the restriction position, the lock pin 66 directly restricts the user's operation on the traction switch lever 48. According to this configuration, there is no need for a mechanism that couples a different member than the lock pin 66 with the traction switch lever 48 since the lock pin 66 directly restricts the user's operation on the traction switch lever 48. Thus, it is possible to prevent the traction motor 32 from being unintentionally driven when the handle unit 6 is in the non-working state by using a simpler configuration.

(Correspondence Relationships)

The mower 2 is an example of "working machine". The traction motor 32 is an example of "prime mover". The traction switch lever 48 is an example of "trigger member". The lock pin 66 is an example of "lock member". In one aspect, the handle unit 6 is an example of "handle". In another aspect, the upper arm 43 and the grip 44 are an example of "handle".

While specific examples of the present disclosure have been described above in detail, these examples are merely illustrative and place no limitation on the scope of the patent claims. The technology described in the patent claims also encompasses various changes and modifications to the specific examples described above.

(Variant 1) The "working machine" may be a scarifier, a sweeper, an electric-powered wheeled platform, or the like. In case of such a working machine, the non-working state is a state in which the handle is folded toward the body and the working state is a state in which the handle is raised from the body. In another variant, the "working machine" may be a grass cutter, an earth auger, or the like. For example, in case of a grass cutter, the working suite is a state in which the blade (an example of "working part") is positioned below a connection between the body and the handle, and the non-working state is a state in which the blade is positioned above the connection.

(Variant 2) The "lock member" is not limited to the lock pin 66, and may be configured of particulate matter or the like. In the present variant, the switch housing 60 includes a housing portion that houses the particulate matter. When the handle unit 6 is in the working state, all the particulate matter is housed in the housing portion. On the other hand, when the handle unit 6 is in the non-working state, all or a part of the particulate matter pops out of the housing portion. The operation on the traction switch lever 48 is restricted by the particulate matter popped out of the housing portion.

(Variant 3) The mower 2 may comprise a lock-off member that puts restriction on the operation on the traction switch lever 48 and releases the restriction on the operation. For example, the lock-off member may be positioned at the switch housing 60 of the left, switch unit 52. In this case, the traction switch lever 48 may be operable while the lock-off member is operated by the user. According to this configuration, it is possible to surely prevent the traction motor 32 from being unintentionally driven when the handle unit 6 is in the non-working state.

(Variant 4) The mower 2 may comprise a lock-off member that puts restriction on the operation on the traction switch lever 48 and releases the restriction, on the operation, and a lock member configured to move between a non-restriction position at which a user's operation on the lock-off member is not restricted and a restriction position at which the user's operation on the lock-off member is restricted. In the present variant, the mower 2 may not comprise the lock pin 66. The lock member may be at the non-restriction position when the handle unit 6 is in the working state and may be at the restriction position when the handle unit 6 is m the non-working state. The lock member may move from the non-restriction position to the restriction position in response to the shift of the handle unit 6 from the working state to the non-working state. In the present variant, the operation on the traction switch lever 48 is restricted while the lock-off member is not operated. Thus, the user's operation on the traction switch lever 48 can be restricted by restricting the user's operation on the lock-off member. This configuration can also prevent the traction motor 32 from being unintentionally driven when the handle unit 6 is in the non-working state. In another variant, the mower 2 may comprise both the lock-off member above and the lock pin 66.

(Variant 5) The mowing motor 30 and the mowing switch lever 46 of the mower 2 may be air example of "prime mover" and an example of "trigger member", respectively. In the present variant, the mower 2 may comprise a lock member configured to move between a non-restriction position at which a user's operation on the mowing switch lever 46 is not restricted and a restriction position at which the user's operation on the mowing switch lever 46 is restricted. This lock member may be at the non-restriction position when the handle unit 6 is in the working state, whereas it may be at the restriction position when the handle unit 6 is in the non-working state. The lock member may move from the non-restriction position to the restriction position in response to the shift of the handle unit 6 from the working state to the non-working state. In another variant, the mower 2 may comprise a lock member configured to move between a non-restriction position at which a users operation on the lock-off button 54 (an example of "lock-off member") is not restricted and a restriction position at which the user's operation on the lock-off button 54 is restricted. This lock member may be at the non-restriction position when the handle unit 6 is in the working state, may be at the restriction position when the handle unit 6 is in the non-working state, and may move from the non-restriction position to the restriction position in response to the shift of the handle unit 6 from the working state to the non-working state. As described, the operation on the mowing switch lever 46 is restricted when the lock-off button 54 is not pushed in. Thus, the user's operation on the mowing switch lever 46 can be restricted by restricting the user's operation on the lock-off button 54. This configuration can also prevent the mowing motor 30 from being unintentionally driven when the handle unit 6 is in the non-working state.

(Variant 6) The mower 2 may comprise a biasing member that biases the lock pin 66. For example, the biasing member may bias the lock pin 66 from the non-restriction position toward the restriction position when the handle unit 6 is in the non-working state.

What is claimed is:

1. A working machine comprising:
    a body;
    a working part disposed on the body;
    a prime mover;
    a handle attached to the body and configured to be gripped by a user;
    a switch mechanism for driving the prime mover;
    a trigger member configured to be operated by the user for driving the prime mover and configured to be movable between a first position and a second position, wherein the first position is a position where the trigger member does not contact the switch mechanism and the second position is a position where the trigger member pushes in the switch mechanism; and
    a lock member,
    wherein
    the handle is configured to shift between a working state and a non-working state,
    the lock member is configured to:
        move between a non-restriction position and a restriction position, wherein when the lock member is positioned at the non-restriction position, a user's operation on the trigger member from the first position to the second position is not restricted, and when the lock member is positioned at the restriction position, the user's operation on the trigger member from the first position to the second position is restricted;
        be positioned at the non-restriction position when the handle is in the working state;
        be positioned at the restriction position when the handle is in the non-working state; and
        move from the non-restriction position to the restriction position in response to shift of the handle from the working state to the non-working state.

2. The working machine according to claim 1, wherein in response to shift of the handle from the non-working state to the working state, the lock member is configured to move from the restriction position to the non-restriction position.

3. The working machine according to claim 1, wherein the lock member is a lock pin configured to move in response to shift of the handle,
    the handle comprises a lock groove in which the lock pin slides,
    at the restriction position, the lock pin restricts the user's operation on the trigger member by a part of the lock pin projecting from the lock groove, and
    at the non-restriction position, an entirety of the lock pin is housed in the lock groove.

4. A working machine comprising:
    a body;
    a working part disposed on the body;
    a prime mover;
    a handle attached to the body and configured to be gripped by a user;
    a trigger member configured to be operated by the user for driving the prime mover; and
    a lock member,
    wherein
    the handle is configured to shift between a working state and a non-working state,
    the lock member is configured to:
        move between a non-restriction position and a restriction position, wherein when the lock member is positioned at the non-restriction position, a user's operation on the trigger member is not restricted, and when the lock member is positioned at the restriction position, the user's operation on the trigger member is restricted;
        be positioned at the non-restriction position when the handle is in the working state;
        be positioned at the restriction position when the handle is in the non-working state; and
        move from the non-restriction position to the restriction position in response to shift of the handle from the working state to the non-working, wherein
    when the handle is in the working state, a weight of the lock member acts in a direction in which the lock member moves from the restriction position to the non-restriction position, and
    when the handle is in the non-working state, the weight of the lock member acts in a direction in which the lock member moves from the non-restriction position to the restriction position.

5. The working machine according to claim 1, wherein at the restriction position, the lock member directly restricts the user's operation on the trigger member.

6. The working machine according to claim 1, wherein the handle comprises a lock-off member configured to be operated by the user, and
    while the lock-off member is operated by the user, the trigger member is operable by the user.

7. A working machine comprising:
    a body;
    a working part disposed on the body;
    a prime mover;
    a handle attached to the body and configured to be gripped by a user;
    a trigger member configured to be operated by the user for driving the prime mover; and
    a lock pin configured to be moved in response to shift of the handle,
    wherein
    the handle comprises a lock groove in which the lock pin slides and a lock-off member configured to be operated by the user,
    while the lock-off member is operated by the user, the trigger member is operable by the user,
    the handle is configured to shift between a working state and a non-working state,
    the lock pin is configured to:
        move between a non-restriction position and a restriction position, wherein when the lock pin is positioned at the non-restriction position, a user's operation on the trigger member is not restricted, and when the lock pin is positioned at the restriction position, the user's operation on the trigger member is restricted;

be positioned at the non-restriction position when the handle is in the working state;

be positioned at the restriction position when the handle is in the non-working state;

move from the non-restriction position to the restriction position in response to shift of the handle from the working state to the non-working state; and move from the restriction position to the non-restriction position in response to shift of the handle from the non-working state to the working state, wherein at the restriction position, the lock pin directly restricts the user's operation on the trigger member by a part of the lock pin projecting from the lock groove, and at the non-restriction position, an entirety of the lock pin is housed in the lock groove, wherein when the handle is in the working state, a weight of the lock member acts in a direction in which the lock member moves from the restriction position to the non-restriction position, and when the handle is in the non-working state, the weight of the lock member acts in a direction in which the lock member moves from the non-restriction position to the restriction position.

\* \* \* \* \*